(12) United States Patent
Lekovic et al.

(10) Patent No.: US 8,372,893 B2
(45) Date of Patent: *Feb. 12, 2013

(54) POLYURETHANE FOAM

(75) Inventors: Hanna Lekovic, Troy, MI (US); Frank Hoefflin, Royal Oak, MI (US); Michael Anderson, Oxford, MI (US); Trent Shidaker, The Woodlands, TX (US); Michael Connolly, Ypsilanti, MI (US); Sheila Dubs, Conroe, TX (US); Jinhuang Wu, Troy, MI (US)

(73) Assignee: Sika Technology AG, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/243,826

(22) Filed: Sep. 23, 2011

(65) Prior Publication Data

US 2012/0015103 A1    Jan. 19, 2012

Related U.S. Application Data

(63) Continuation of application No. 12/265,487, filed on Nov. 5, 2008, now Pat. No. 8,053,485.

(60) Provisional application No. 60/986,497, filed on Nov. 8, 2007.

(51) Int. Cl.
*C08G 18/28*    (2006.01)

(52) U.S. Cl. ........ 521/174; 521/130; 521/163; 521/164; 521/167; 521/170; 521/175; 521/176; 428/423.1; 428/425.8

(58) Field of Classification Search .................. 521/130, 521/163, 164, 167, 170, 174, 175, 176; 428/423.1, 428/425.8

See application file for complete search history.

(56) References Cited

U.S. PATENT DOCUMENTS

| 3,489,598 | A | 1/1970 | Winkler |
| 4,110,272 | A | 8/1978 | Kanner et al. |
| 4,722,946 | A | 2/1988 | Hostettler |
| 4,780,482 | A | 10/1988 | Krueger |
| 5,278,195 | A | 1/1994 | Volkert et al. |
| 5,523,334 | A | 6/1996 | White, III et al. |
| 5,690,855 | A | 11/1997 | Nichols et al. |
| 5,817,860 | A | 10/1998 | Rizk et al. |
| 6,262,136 | B1 * | 7/2001 | Dobransky .................... 521/131 |
| 6,759,448 | B2 * | 7/2004 | Toyota et al. ................. 521/174 |
| 6,762,274 | B2 | 7/2004 | Waddington et al. |
| 7,151,121 | B2 | 12/2006 | Nichols et al. |
| 8,053,485 | B2 * | 11/2011 | Lekovic et al. ............... 521/130 |
| 2004/0192800 | A1 | 9/2004 | Shidaker et al. |
| 2005/0234142 | A1 | 10/2005 | Casati et al. |
| 2006/0135634 | A1 | 6/2006 | Guidetti et al. |
| 2008/0125507 | A1 | 5/2008 | Jenny et al. |
| 2008/0125508 | A1 | 5/2008 | Jenny et al. |

FOREIGN PATENT DOCUMENTS

| DE | 19618576 A1 | 11/1997 |
| EP | 1 679 327 A | 7/2006 |
| EP | 1842976 A | 10/2007 |
| GB | 2313838 A | 12/1997 |
| WO | WO-9637533 A | 11/1996 |
| WO | WO-2008066809 A | 6/2008 |
| WO | WO-2008066898 A | 6/2008 |

OTHER PUBLICATIONS

Graco Manual for Operation, Parts, Service, Repair for GX-7A, GX-7 DI, and GX-7 400 Spray Guns; 54 pages, (May 2007).
Product Flyer Entitled "A Revolution in Reaction Injection Molding (RIM) Equipment)" by Graco; 1 page, (2008).
"Polyurethane Foam-Making Calculations" dated Oct. 30, 2007 from website: http://dow-answer.custhelp.com/cgi-bin/dow_answer.cfg/php/enduser/prnt_adp.php?p_fa . . . ; 4 pages.
CPI "Gusmer GX-7 400 Spray Gun" dated Nov. 1, 2007 from website http://www.cpilc.com/prd-gu-guns-gx7-400.htm; 2 pages.
Product Flyer for RIMLINE pulltrusion systems Entitled "Typical Processing Equipment and Conditions"; 1 page, (2008).
PCT International Search Report for PCT/US2008/082723, (Feb. 2009).

* cited by examiner

*Primary Examiner* — John Cooney
(74) *Attorney, Agent, or Firm* — Rader, Fishman & Grauer PLLC

(57) ABSTRACT

This disclosure describes a method of making a polyurethane foam and a method of reducing NVH expected to be experienced by a substrate using the foam. When the foam is subjected to 95% relative humidity for a period of 7 days at a temperature of about 50° C., the foam absorbs an amount of water that is less than about 30% of the weight of the foam.

6 Claims, 2 Drawing Sheets

POLYURETHANE FOAM

CROSS-REFERENCE TO RELATED APPLICATIONS

This application is a Continuation of U.S. patent application Ser. No. 12/265,487, filed on Nov. 5, 2008 which is now U.S. Pat. No. 8,053,485, which claims the benefit of U.S. Provisional Patent Application No. 60/986,497, filed on Nov. 8, 2007, the entirety of which are hereby incorporated by reference in their entirety.

FIELD

The present disclosure relates generally to polyurethane foams, and more particularly, to polyurethane foams that are suitable for use as structural reinforcing, sealing and/or acoustic damping members.

BACKGROUND

During the fabrication of automobiles, trucks, and similar over-the-road vehicles, many body components present structural members having cavities that require sealing to prevent the entrance of moisture and contaminants which can cause corrosion of the body parts. It is generally desirable to strengthen the members while maintaining their light weight. It is also beneficial to stabilize these members in order to attenuate and dampen noise and vibrations that would otherwise be transmitted along the length or passage of the cavity. Many of these cavities are irregular in shape or narrow in size, thus making them difficult to properly seal.

Polyurethanes are a class of materials that can be used to prepare rigid foams and are potentially useful for forming the type of reinforcing, sealing, and/or acoustic damping members described above. Polyurethanes are prepared by combining one or more polyols with one or more polyisocyanates. Commonly used polyisocyanates include aromatic diisocyanates, such as methylene diphenyl diisocyanate ("MDI") and toluene diisocyanate ("TDI"), as well as oligomers or polymers thereof.

Many known polyisocyanates are supplied with significant levels (more than 20%) of free isocyanate monomer. The reaction temperatures used to drive the polyurethane formation process typically raise the vapor pressure of the unreacted monomer and cause it to volatilize. Due to the toxicity of certain isocyanate monomers, additional steps are often taken to reduce their atmospheric concentration in areas to which personnel are exposed. In some instances, ventilated structures such as "down draft booths" are provided to minimize personnel exposure to the volatilized monomers. However, providing such ventilated structures can be costly and difficult. Thus, a need has arisen for a polyurethane foam that addresses the foregoing issues.

DETAILED DESCRIPTION

Figure 1:
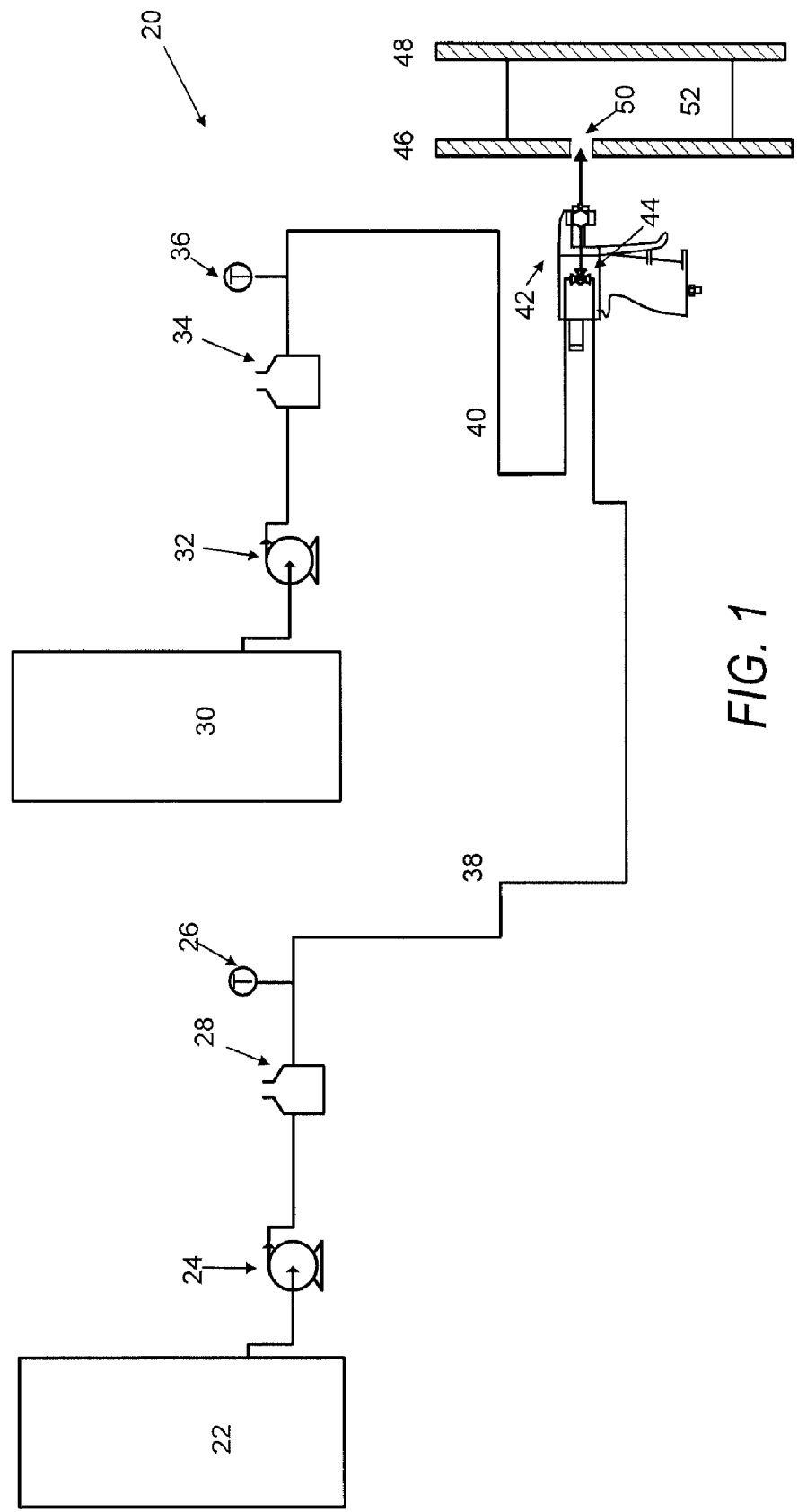
FIG. 1 depicts a process used to prepare and apply a polyurethane foam to a cavity of a structure.

Described herein are polyurethane compositions that are particularly suited for preparing rigid foams. While the rigid foams have a number of applications, one application of particular interest involves sealing and structural reinforcing members used to seal cavities between structural members of mechanical devices or structures, including cavities formed in various locations within vehicle bodies. Another application of interest involves acoustic damping foams that dampen acoustic vibrations to reduce the noise, vibration, and harshness ("NVH") experienced by vehicle occupants. In such applications, it is desirable to use foam of relatively low density, low water absorption, and high sag resistance. It is also desirable to apply the foam such that it forms a tight seal and/or closely follows the contours of the cavity being sealed or the substrate being foamed.

The compositions described herein provide a polymeric foam that is suitable for sealing, reinforcing, and/or acoustic damping applications while advantageously reducing the amount of free, unreacted isocyanate monomer that is volatilized. In certain embodiments, the foams are referred to as "booth free" foams because they can be applied without the use of down draft booths. The polyols and polyisocyanates tend to react quickly. As a result, in certain embodiments, the reactants used to prepare the foam are provided in liquid form and are concurrently mixed and applied to the cavity or substrate of interest, causing the rapid formation of foam and sealing of the cavity or foaming of the substrate.

The polymeric foam compositions described herein generally comprise a first component that includes at least one polyol, and a second component that includes at least one polyisocyanate. A blowing agent is also generally provided. The blowing agent causes the formation of gas which then creates the cells in the polyurethane that define the foamed structure. In a preferred formulation, the blowing agent is water, which reacts with the polyisocyanate to produce carbon dioxide gas. However, other blowing agents may be used, either alone or in combination with water. The polyurethane compositions may also include cross-linkers, chain extenders, catalysts, cell openers, additives, and surfactants.

As is known to those skilled in the art, polyurethane compositions can be characterized by an index that is defined as the ratio of the equivalents of isocyanate groups to the equivalents of hydroxyl groups:

$$\text{Index} = \frac{\text{number of equivalents of isocyanate groups}}{\text{number of equivalents of hydroxyl groups (including water)}} \quad (1)$$

In equation (1), the number of isocyanate equivalents is based on all isocyanate-containing compounds, including isocyanate functional groups that are present as free isocyanate-containing monomers and as functional groups on polymeric or oligomeric polyisocyanates. Similarly, the number of equivalents of hydroxyl groups is based on all compounds that contain hydroxyl groups, including water. As will be seen below, certain catalysts, additives, surfactants, cell openers, and other additives may include hydroxyl groups, and these sources of hydroxyl groups are also included in calculating the denominator of the Index.

As is known to those skilled in the art, the number of equivalents of a functional group in a particular polymeric material or in a given molecule can be determined by the following equation:

$$\text{No. Equivalents} = \frac{\text{Wt. of polymer or molecule (g)}}{\text{equivalent weight of the polymer or molecule}} \quad (2)$$
$$\text{(g/equivalent)}$$

For a given molecule bearing a particular functional group, the equivalent weight may be determined as follows:

$$\text{Equivalent Weight} = \frac{\text{molecular weight of functional group (g/mol)}}{\text{number of occurrences of the functional group on the molecule}} \quad (3)$$

Many commercially available polyisocyanates are mixtures of isocyanate molecules, oligomers, and/or polymers and are characterized based on their percentage by weight of isocyanate functional groups (% NCO). Thus, the equivalent weight based on isocyanate groups can be calculated as follows:

$$\text{Equivalent weight} = \frac{\text{molecular weight of } -NCO}{(\% \, NCO/100)} \quad (4)$$

Where the molecular weight of —NCO is 42 g/mol. Many commercially available polyols are characterized by a "hydroxyl number" ("OH number") which represents the number of milligrams of potassium hydroxide equivalent to the hydroxyl content of 1.0 gram of the polyol. For such polyols, the equivalent weight based on hydroxyl groups can be calculated as follows:

$$\text{Equivalent weight} = \frac{(56.1 \text{ g } KOH/\text{mol})(1000 \text{ mg/g})}{OH \text{ number (mg } KOH/\text{g } polyol)} \quad (5)$$

As indicated above, in certain illustrative formulations described herein, water is provided and acts as a blowing agent. Water has two hydrogen atoms and is considered to be a di-functional molecule because one molecule of water consumes two (2) isocyanate groups. Thus, the equivalent weight of water is 18 (g/mol)/2=9 g/equivalent. In formulations involving multiple hydroxy-functional components, the number of equivalents of each component is calculated and summed to arrive at the denominator of the Index in equation (1) above.

In certain illustrative embodiments, the ratio of isocyanate equivalents to hydroxyl equivalents (the Index) is adjusted to reduce the amount of free isocyanate monomer (e.g., MDI or TDI) that is volatilized during the polyurethane formation reaction. It is generally preferred that the Index is less than 1.0. While lower Index values tend to reduce the amount of free isocyanate monomer, they also tend to undesirably increase the amount of water absorbed by the polymeric foam, owing to the presence of additional, unreacted hydroxyl groups. Thus, in certain preferred polymeric foam compositions, the Index ranges from about 0.80 to less than 1.0. In more preferred compositions, the Index ranges from about 0.85 to about 0.95. In an especially preferred composition, the Index ranges from about 0.90 to about 0.91.

A variety of different polyisocyanates may be used to prepare polyurethane foams of the type described herein. Suitable polyisocyanates include organic polyisocyanates such as aromatic polyisocyanates, aliphatic, cycloaliphatic, or araliphatic polyisocyanates. Especially preferred are those polyisocyanates that are liquid at 25° C. Examples of suitable polyisocyanates include 1,6-hexamethylenediisocyanate; isophorone diisocyanate; 1,4-cyclohexane diisocyanate; 4,4'-dicyclohexylmethane diisocyanate; 1,4-xylylene diisocyanate; 1,4-phenylene diisocyanate; 2,4-toluene diisocyanate; 2,6-toluene diisocyanate; 4,4'-diphenylmethane diisocyanate (4,4'-MDI); 2,4'-diphenylmethane diisocyanate (2,4'-MDI); polymethylene polyphenylene polyisocyanates (crude, or polymeric, MDI); and 1,5-naphthalene diisocyanate. Mixtures of these polyisocyanates can also be used. Moreover, polyisocyanate variants, for example polyisocyanates that have been modified by the introduction of urethane, allophanate, urea, biuret, carbodiimide, uretonimine, isocyanurate, and/or oxazolidone residues, can also be used.

In general, aromatic polyisocyanates are preferred. The most preferred aromatic polyisocyanates are 4,4'-MDI, 2,4'-MDI, polymeric MDI, MDI variants, and mixtures of these. Isocyanate terminated prepolymers may also be employed, but are less preferred. Such prepolymers are generally prepared by reacting a molar excess of polymeric or pure polyisocyanate with one or more polyols. The polyols may include aminated polyols, imine or enamine modified polyols, polyether polyols, polyester polyols or polyamines. Pseudoprepolymers, which are a mixture of isocyanate terminated prepolymer and one or more monomeric di or polyisocyanates, may also be used.

Toluene-2-4-diisocyanate, toluene-2-6-diisocyanate and mixtures thereof are generically referred to as "TDI." Diphenylmethane-4,4'-diisocyanate (4,4' methylene diphenyl diisocyanate), diphenylmethane-2,2'-diisocyanate (2,2' methylene diphenyl diisocyanate), and diphenylmethane-2,4'-diisocyanate (2,4' methylene diphenyl diisocyanate) and mixtures thereof are generically referred to as "MDI" herein. The 4,4' isomer is referred to as "pure MDI".

As is known to those skilled in the art, polyisocyanates can be characterized based on a "functionality" that represents the average number of isocyanate groups per molecule in the polyisocyanate. The polyisocyanates preferably have a number-averaged isocyanate functionality of from at least 1.8 to about 4.0 Especially preferred polyisocyanates include MDI or TDI-based polyisocyanates having a functionality of from about 2.0 to about 3.0, and more preferably from about 2.3 to about 2.9. As mentioned above, polyisocyanates may also be characterized based on an isocyanate content (% NCO) that represents the amount of isocyanate functional groups that are present by weight. Pure MDI has an isocyanate content of 33.6% by weight, and pure TDI has an isocyanate content of 48.2% by weight. Preferred polyisocyanates have an isocyanate content (by weight) that is above about twenty (20) percent. More preferred polyisocyanates have an isocyanate content of at least about twenty-five (25) percent by weight, and especially preferred polyisocyanates have an isocyanate content of at least about 30 percent by weight. Commercially available polyisocyanates that are suitable for use in the formulations described herein include those supplied by Huntsman Polyurethanes under the Rubinate® name. One exemplary MDI-based polyisocyanate is Rubinate® 8700. Rubinate® 8700 is a polymeric diphenylmethane diisocyanate comprising free MDI as well as some amount of polymerized and/or oligomerized MDI, which has a functionality of approximately 2.7 and an isocyanate content (by weight) of about 31.5 percent.

A variety of polyols may be used to prepare polymeric foams in accordance with this disclosure. Exemplary polyols include polyhydroxyalkane polyols, polyoxyalkylene polyols, alkylene oxide adducts of polyhydroxyalkanes, alkylene oxide adducts of non-reducing sugars and sugar derivatives, alkylene oxide adducts of phosphorus and polyphosphorus acids, alkylene oxide adducts of polyphenols and polyols derived from natural oils, such as castor oil.

In a preferred polyurethane foam composition, two polyol components are used. The first polyol component is a sucrose-initiated polyol having a functionality (i.e., average number of hydroxyl groups per molecule of the polyol) of from about 4 to about 5, and the second polyol component is an amine-initiated polyol having a functionality of from about 2.5 to about 3.5. One suitable sucrose-initiated polyol is Jeffol® SD 361, which is supplied by Huntsman Polyurethanes. Jeffol® SD 361 has a hydroxyl number of 360 and an average functionality of 4.4. Suitable amine-initiated polyols include Jeffol® A-630, which has a hydroxyl number of 635 and an average functionality of 3.0.

As mentioned above, the polyurethane foams described herein are prepared by combining and reacting a "second component" comprising at least one polyisocyanate with a "first component" that includes the at least one polyol. In a preferred formulation, the amount of sucrose-initiated polyol generally ranges from about 50 percent to about 70 percent by weight of the first component and preferably ranges from about 55 to about 65 percent by weight of the first component. The amount of amine-initiated polyol ranges generally from about ten (10) to about 30 percent by weight of the first component, and preferably ranges from about fifteen (15) to about twenty (20) percent by weight of the first component. This first component may also include several other types of ingredients used to adjust the properties of polyurethane foam, such as cross-linkers, chain extenders, cell openers, surfactants, and blowing agents.

The total amount of cross-linkers and chain extenders is preferably sufficient to cause cross-linking and chain extension to occur in the polyurethane product. The total amount of cross-linkers and chain extenders ranges generally from about five (5) to about fifteen (15) percent by weight of the first component. Preferred cross-linkers and chain extenders include hydroxyl functional compounds, such as diols and triols. In one preferred formulation, the first component used to form the polyurethane foam comprises a diol that acts as both cross-linker and chain extender and a triol cross linker. In an exemplary formulation, the diol cross-linker/chain extender is polyethylene glycol 400 (PEG 400) having a hydroxyl number ranging from about 267 to about 295, such as Polyglykol 400, which is supplied by the Clariant Corporation. In an exemplary formulation, the triol cross-linker is glycerine (1,2,3 tri-hydroxy propane). The diol cross linker and chain extender is preferably present in an amount that is effective to cause cross linking and chain extension to occur in the polyurethane. The triol cross linker is preferably present in an amount that is effective to cause cross-linking to occur in the polyurethane.

The first component may also comprise one or more catalysts, which are preferably present in an amount ranging from about one to about ten (10) percent by weight of the first component. In one exemplary formulation, three catalysts are provided. As indicated previously, in the formation of polyurethane foams, isocyanate groups on the polyisocyanate react with hydroxyl groups on the polyols to form polyurethanes. The isocyanate groups also react with water to form carbon dioxide. Thus, the use of multiple catalysts aids in selectively adjusting the relative kinetics of the polyurethane formation and carbon dioxide generation reactions. In one illustrative formulation, the first catalyst (which may be called a "balanced catalyst") catalyzes the reaction of polyisocyanate and polyol and also catalyzes the gelation of the reaction product and the generation of carbon dioxide gas (i.e., it catalyzes the "blow"). The second catalyst catalyzes the generation of carbon dioxide gas, and the third catalyst catalyzes gelation. One exemplary catalyst that may serve as the first catalyst is Polycat® 9, a tertiary liquid amine catalyst supplied by Air Products and Chemicals, Inc. which is miscible in water and soluble in most polyols and organic solvents. An exemplary catalyst that may serve as the second catalyst is Jeffcat ZF-22, supplied by Huntsman Corporation. Jeffcat ZF-22 is a mixture of 70 percent bis-(2-dimethylaminoethyl)ether and 30 percent dipropylene glycol. An exemplary catalyst that may serve as the third (gelling) catalyst is Fomrez UL 1, which is a dibutyltin mercaptide catalyst supplied by Momentive Performance Materials of Wilton, Conn. The first catalyst is preferably present in an amount that is effective to catalyze the reaction of polyols with polyisocyanate, gelation, and blowing. In certain illustrative embodiments, the first catalyst is present in an amount ranging generally from about 0.2 to about 1.0 percent by weight of the first (polyol-containing) component, and is preferably present in an amount ranging from about 0.6 to about 0.7 percent by weight. The second catalyst is preferably present in an amount that is effective to catalyze the generation of carbon dioxide gas from water and isocyanates. In certain illustrative embodiments, the second catalyst is present in an amount ranging from about 1.0 to about 4.0 percent by weight of the first component, and preferably ranges from about 2.0 to about 3.0 percent by weight. The third catalyst is preferably present in an amount that is effective to cause gel formation. In certain illustrative embodiments the third catalyst is present in an amount ranging from about 0.05 to about 0.2 percent by weight of the first component, and preferably ranges from about 0.1 to about 0.2 percent by weight.

The first component may also comprise one or more cell opening compounds (cell-openers). Foams can be generally characterized as "open cell" or "closed cell" depending on whether the windows of adjacent cells are open (i.e., such that the cells are in communication with one another) or closed. In certain illustrative embodiments, the polyurethane foams described herein generally have at least about 80 percent open cells. In certain preferred embodiments, the foams have at least about 90 percent open cells. In an especially preferred embodiment, at least about 95 percent of the cells are open. The cell opening compounds facilitate the production of open cells. Exemplary cell openers include silicon-based antifoamers, waxes, finely divided solids, liquid perfluorocarbons, paraffin oils and long chain fatty acids. If a cell opener is used, it is preferably present in an amount that is sufficient to provide the desired percentage of open cells. In certain embodiments, the cell opener is present an amount that is generally less than one percent by weight of the first component, and which is preferably between about 0.01 and about 0.1 percent by weight. One exemplary cell opener that may be used is Ortegol® 501, a solution of organic polymers having a hydroxyl number of about 2 which is supplied by Evonik Industries.

To facilitate cell formation and stabilization, one or more surfactants may also be included in the first component of the polyurethane formulation. Examples of surfactants include nonionic surfactants and wetting agents, such as those prepared by the sequential addition of propylene oxide and then ethylene oxide to propylene glycol, the solid or liquid organosilicones, polyethylene glycol ethers of long chain alcohols, tertiary amine or alkylolamine salt of long chain alkyl acid sulfate esters, alkyl sulfonic ester and alkyl arylsulfonic acids. The total amount of surfactant is generally less than about two (2) percent by weight of the first component, with amounts ranging from about 1.0 to about 1.5 percent being preferred. In certain preferred formulations, a first polyether polydimethyl siloxane copolymer surfactant, and a second non-hydrolizable silicone copolymer surfactant are used. Exemplary polyether polydimethyl siloxane copolymer surfactants include Tegostab® B8404, which is supplied by Evonik Industries. Exemplary non-hydrolizable silicone copolymer surfactants include Niax Silicone L-6900, which is supplied by Momentive Performance Materials.

Processes of making polyurethane foams from the first polyol-containing component and second polyisocyanate-containing component discussed above will now be described. The polyol and polyisocyanate materials described above generally react quickly, on the order of less than a minute. In general, it is preferred to supply both the first polyol-containing component and the second polyisocyanate-containing component as liquids and to combine and apply them to the cavity or substrate of interest substantially contemporaneously, a process which may be referred to as "reaction injection molding" or "RIM." If the first and second components are combined and applied using a RIM process, they are preferably formulated with a viscosity that is sufficiently low to allow spray application. The combined components will preferably have a reaction profile that achieves a sufficiently high viscosity to prevent the components from flowing away from or outside of the area to which the foam is to be applied. It is also preferable that the first and second components be formulated such that any volatilized residual monomer (e.g., MDI or TDI) is released in sufficiently low amounts to avoid the need for ventilation equipment (hoods, down draft booths) or the use of fresh air equipment. It should be noted that the residual monomer present in the second polyisocyanate-containing component beneficially reduces the second component's viscosity, yielding a viscosity at 25° C. of from about 100 to about 300 cps, with a viscosity of from about 150 cps to about 200 cps being preferred. The lower viscosity facilitates the pumping and spray application of the second polyisocyanate-containing component. Thus, in contrast with processes that consume unreacted isocyanate monomers by forming a polyurethane pre-polymer before adding a blowing agent (e.g., water), the methods described herein provide polyol and polyisocyanate components that can readily be pumped and combined to react as they are applied to a cavity, substrate, etc. In addition, the components described herein can be processed at a lower temperature as compared to those processes involving the formation of a pre-polymer.

An exemplary process 20 of preparing and applying polyurethane foams to a cavity to form, for example, structural reinforcing, sealing, and/or acoustic damping members is depicted in FIG. 1. In this exemplary embodiment, the process equipment is provided in a portable form, allowing an operator to move it from location to location to apply the polyurethane foam to the desired location. Reactant vessel 22 is provided for containing the first polyol-containing component, and reactant vessel 30 is provided for containing the second polyisocyanate-containing component. The first polyol-containing component preferably contains at least one polyol, such as those described above. If blowing agents (including water), cross-linkers, chain extenders, surfactants, catalysts, cell openers, or other additives are provided, they are preferably mixed with the polyols in reactant vessel 22.

Vessel 22 is fluidly connected to metering pump 24 and preheater 28. Preheater 28 is used to adjust the temperature of the first polyol-containing component and facilitates controlling the polyurethane formation reaction temperature. Temperature gauge 26 provides an indication of the temperature of the first polyol-containing component and may serve as an input to a feedback temperature controller that adjusts the rate of heat supplied by preheater 28. Flexible conduit 38 is preferably a hose or tube that connects the preheated first component to application and mixing device 42.

Reactant vessel 30 contains the second polyisocyanate-containing component, which preferably includes at least one polyisocyanate and residual, free isocyanate monomer. As indicated above, other ingredients used to prepare the polyurethane foam, such as blowing agents, catalysts, surfactants, cross-linkers, and chain extenders are preferably not contained in reactant vessel 30, but are instead combined with the polyols in vessel 22. Vessel 30 is fluidly connected to pump 32 and preheater 34. Preheater 34 is used to adjust the temperature of the second polyisocyanate-containing component and along with preheater 28 facilitates controlling the polyurethane formation reaction temperature. Temperature gauge 36 provides an indication of the temperature of the second polyisocyanate containing component and may serve as an input to a feedback temperature controller that adjusts the rate of heat supplied by preheater 34. Flexible conduit 40 is preferably a hose or tube that connects the preheated second component to application device 42.

The reaction temperature used to form polyurethane foams as described herein generally ranges from about 100° F. to about 130° F. Preferred temperatures range from about 105° F. to about 120° F. In one especially preferred embodiment, a reaction temperature of about 110° F. is employed by adjusting preheaters 28 and 34 to provide respective outlet temperatures of about 110° F.

Application and mixing device 42 is preferably configured to turbulently mix the first polyol-containing component and the second polyisocyanate-containing component and to deliver a mixed, controlled flow of the combined reactants to a cavity of interest. In a preferred embodiment, application device 42 is a spray gun such as the GX-15 series of spray guns supplied by Graco, Inc. of Minneapolis, Minn. As indicated in FIG. 1, application device 42 includes an internal mix valve or head 44 that provides for impingement mixing of the first polyol-containing component and the second polyisocyanate-containing component. The first polyol-containing component and the second polyisocyanate-containing component are preferably formulated to provide viscosities that are suitable for pumping the components from their respective vessels 22, 30 to application and mixing device 42 and to ensure that the combined first and second components can be applied via a spray process.

In the embodiment of FIG. 1, rigid structures 46 and 48 define a cavity in which a polyurethane foam member is installed. An acoustic foam is preferred if rigid structures 46 and/or 48 will be subjected to vibration or other acoustic disturbances. An operator aligns application and mixing device 42 to discharge the combined first polyol-containing component and second polyisocyanate containing component into port 50. The combined reactants react quickly to form a polyurethane foam 52 as they are discharged from application and mixing device 42 into the cavity defined by structures 46 and 48. Structures 46 and 48 may comprise a portion of a vehicle, such as an A-pillar or other areas where it is desirable to provide an acoustic foam, seal a cavity, and/or provide structural reinforcement.

As mentioned above, the preparation of polyurethane foams as described herein beneficially reduces the amount of volatilized free isocyanate monomer that is emitted and thus can be performed without the use of ventilation equipment or fresh air. In certain preferred embodiments, the process of forming the polyurethane foams results in the emission of less than 10 micrograms of free isocyanate monomer for every pound of solid foam that is formed. In a preferred embodiment, less than 0.5 micrograms of free isocyanate monomer is released for every pound of solid foam that is formed. In one exemplary process, less than 0.45 micrograms of free isocyanate monomer is released per pound of foam, while in another exemplary process, less than 0.40 micrograms is released per pound of foam.

The U.S. Occupational Safety and Health Administration has published a standard and test method governing the permissible levels of atmospheric MDI which may be released, OSHA Organic Method #47, which is incorporated by reference herein. In addition, certain vehicle manufacturers use the "5 gallon can test" to determine the amount of free isocyanate released in the production of polyurethane foams. In accordance with the 5 gallon can test method, 300 grams of the combined first polyol-containing component and second polyisocyanate-containing component are simultaneously mixed and injected as a single shot into a 5 gallon can in an amount sufficient to produce an expanded foam that occupies approximately one-half of the can's volume. A Tedlar bag is attached to the can to accommodate the displacement of gas due to the injection of the foam. Immediately after injection of the first and second components, the injection port is sealed to provide a closed system. A 13 mm treated filter cassette prepared in accordance with OSHA Organic Method #47 is provided which is in fluid communication with the vapor space in the can. The cassette traps the volatilized free isocyanate that is emitted during the foam formation reaction. Vapor from the can passes through the filter cassette, and the filtered vapor is directed back into the can with an air pump. The sampling is continued for a period of 5-10 minutes. The test is repeated ten (10) times to collect ten (10) cassettes. The cassettes are then analyzed to determine the amount (micrograms) of free isocyanate (e.g., MDI) captured by the cassette, and the results are averaged. One exemplary method of performing the cassette analysis is the high pressure liquid chromatography ("HPLC") method outlined in OSHA Organic Method #47. In certain preferred embodiments, the foams prepared herein will emit no more than 0.3 micrograms of free isocyanate monomer as measured by the 5 gallon can test. If the free rise density of the foam is 2.0 lb/cu.ft. this yields an emission of 0.45 micrograms of free isocyanate per pound of foam, assuming that the foam occupies one-half of the five gallon can's volume.

As mentioned previously, polyurethane foams may be characterized by a density measure known as "free rise density." In certain illustrative embodiments of polyurethane foams of the type described herein, the free rise density ranges generally from about 1.0 to about 5.0 lb/cu. ft. In certain preferred embodiments, the free rise density ranges from about 2.0 to about 3.0 lb./cu. ft., and in more preferred embodiments the free rise density ranges from about 2.0 to about 2.2 lb./cu. ft. Free rise density may be determined by weighing a cup of a pre-determined volume (e.g., 16 fluid oz. or 32 fluid oz.) and over-filling it with foam to create a crown that rises above the cup's rim. The foam is then fully cured for a period of about 15 minutes, and the crown is cut off to ensure that the foam closely conforms to the cup volume. The cup is again weighed with the foam in it, and the weight of the foam is determined by calculating the difference between the weight of the foamed cup and the weight of the cup prior to foaming. The free rise volume is then determined by dividing the foam weight by the cup volume. To improve the accuracy of the method, a cup of the same model may be pre-weighed and filled to its rim with water, which has a density of 1 g/cc. The cup may then be re-weighed. The true volume of the cup in cubic centimeters may then be determined by subtracting the weight of the pre-weighed cup from the weight of the water-filled cup. The previously calculated foam weight may then be divided by the true cup volume to obtain the free rise density.

The foams described herein may also be characterized based on their absorption of water under certain reference conditions. As indicated previously, increases in the ratio of isocyanate equivalents to hydroxyl equivalents tend to increase the amount of free isocyanate monomer that is volatilized during a foam forming operation. However, as the ratio decreases, the number of unreacted hydroxyl groups present in the foam increases. The unreacted hydroxyl groups will have a tendency to absorb water, which can degrade the acoustic, sealing, and/or strengthening function of the foam. In one exemplary water absorption test, the foam is subjected to a 50° C., 95% relative humidity environment for a period of seven (7) days, and the weight of the foam is determined before and after the seven (7) day period. The percentage increase in the weight of the foam is then calculated. Using this water absorption test method, the foams described herein will generally have a water absorption of less than about 30 percent, preferably, less than about ten (10) percent, and more preferably less than about five (5) percent. In one especially preferred exemplary, the polyurethane foam has a water absorption of about two (2) percent.

In certain exemplary processes, it is preferable that the first polyol-containing component and the second polyisocyanate-containing component begin to foam quickly to provide an initial sag resistance as the polyurethane formation reaction proceeds. One measure of the rapidity of foaming is known as "cream time," which is defined as the elapsed time between the dispensing of the first polyisocyanate-containing component and second polyol-containing component and the moment when the combined components start to rise as detected by visual observation. The formulations and processes described herein will yield foams with a cream time that is generally less than about ten (10) seconds, with cream times of less than about five (5) seconds and less than about one (1) second being more preferred and especially preferred, respectively.

In certain exemplary processes, it is preferable that the first polyol-containing component and the second polyisocyanate-containing component react and gel quickly to ensure that the foam remains substantially contained within the cavity or on the substrate of interest. One measure that is useful for characterizing foams is known as the "gel time." One exemplary method of determining gel time comprises dispensing a fixed mass (e.g., 60 g) of foam into a paper cup. Immediately following the dispensing step, the edge of a wooden tongue depressor is repeatedly contacted with the expanding foam surface. Once a string of material is formed from the combined first polyisocyanate component and the second polyol-containing component, the elapsed time is recorded. The process is preferably repeated several times, and the gel time is calculated as the average elapsed time between the dispensing of the first polyisocyanate-containing component and second polyol-containing component and the formation of a string of material from the combined components. The foams prepared in the manner described exhibit gel times that are generally from about two (2) to about ten (10) seconds. Gel times of from three (3) to about eight (5) seconds are preferred, and a gel time of about four (4) seconds is more preferred.

EXAMPLE

An exemplary polyurethane foam composition and process of making the foam will now be described. The exemplary foam has a ratio of isocyanate equivalents to hydroxyl equivalents (i.e., an Index) of 0.91. 100 g of a first polyol-containing component is prepared by combining the ingredients listed in Table 1.

TABLE 1

| Component | Description | Wt. (g) | —OH No. | Equiv. Wt. (g) | No. Equiv. |
|---|---|---|---|---|---|
| Jeffol ® SD-361 | Sucrose-initiated polyol | 62.08 | 360 | 155.83 | 0.3984 |
| Jeffol ® A-630 | Amine-initiated polyol | 17.74 | 635 | 88.34 | 0.2008 |
| Polyglykol 400 | PEG 400 cross-linker/chain extender | 8.87 | 281 | 200 | 0.0444 |
| Glycerine | 1,2,3 tri-hydroxy propane cross-linker | 3.10 | | 30.7 | .1010 |
| Polycat ® 9 | Tertiary amine catalyst | 0.67 | n/a | n/a | 0 |
| Fomrez ® UL-1 | Dibutyltin mercaptide gelling catalyst | 0.13 | n/a | n/a | 0 |
| Jeffcat ZF-22 | 70% bis (2-dimethylaminoethyl)ether/ 30% dipropylene glycol, blow catalyst | 2.66 | 251 | 223 | 0.0120 |
| Tegostab ® B8404 | Polyether polydimethyl-siloxane copolymer surfactant | 0.89 | n/a | n/a | 0 |
| Ortegol ® 501 | organic polymer solution cell opener | 0.09 | 2 | 28050 | 0 |
| Niax L-6900 | Non-hydrolizable silicone copolymer surfactant | 0.22 | 40 | 1403 | 0 |
| Water | Blowing agent | 3.55 | | 9 | 0.3944 |
| TOTAL | | 100 | | | 1.151 |

The second polyisocyanate containing component comprises 140 g of Rubinate® 8700 polymeric diphenylmethane diisocyanate, which also includes free methylene diphenyl diisocyanate and has an isocyanate content of 31.5 percent by weight. The equivalent weight of Rubinate® 8700 is 133 g/eq. Thus, 140 g of Rubinate® 8700 yields 1.05 equivalents, and the Index is 1.05/1.151=0.91.

The first and second components are preheated to a temperature of about 110° F. and are combined in an application and mixing device such as spray gun 42 depicted in FIG. 1. The components are then sprayed into a cavity of a structure and allowed to react and cure, yielding a substantially rigid foam. The free MDI that is emitted during the process is less than 0.45 micrograms/lb. foam, and the free rise density is in the range of about 2.0 to 2.2 lb./cu. ft. The water absorption based on exposure to 95% relative humidity using the test method previously described is about two (2) percent. The foam has a cream time of less than one (1) second, a gel time of about four (4) seconds and shows excellent sag resistance.

Figure 2:
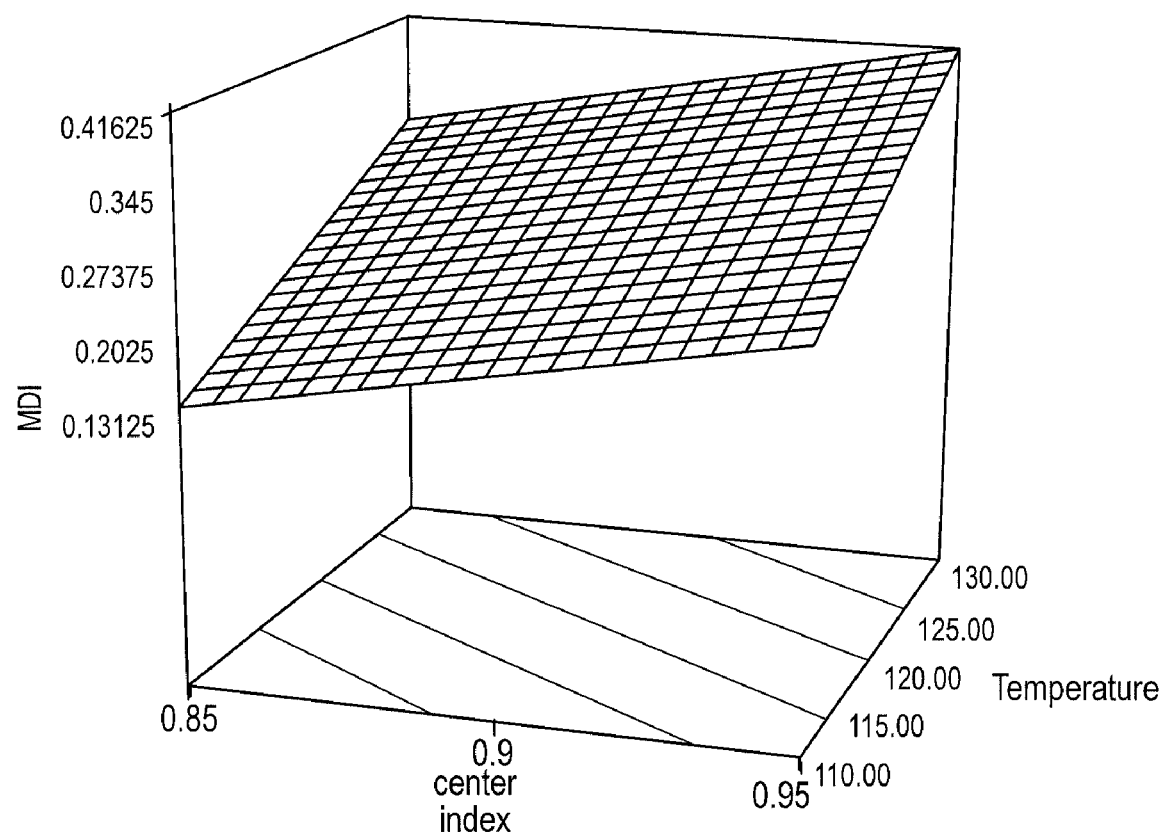
FIG. 2 depicts the variation of volatilized methylene diphenyl diisocyanate as a function of both reaction temperature and the ratio of isocyanate equivalents to hydroxyl equivalents in a polyurethane formulation.

Referring to FIG. 2, design of experiment data is provided for the following modified version of the foam formulation provided in Table 1.

TABLE 2

| Component | Description | Wt. % |
|---|---|---|
| Jeffol ® SD-361 | Sucrose-initiated polyol | 63.56 |
| Jeffol ® A-630 | Amine-initiated polyol | 18.16 |
| Polyglykol 400 | PEG 400 cross-linker/chain extender | 9.08 |
| Glycerine | 1,2,3 tri-hydroxy propane cross-linker | 3.18 |
| Polycat ® 9 | Tertiary amine catalyst | 0.68 |
| Fomrez ® UL-1 | Dibutyltin mercaptide gelling catalyst | 0.03 |
| Jeffcat ZF-22 | 70% bis (2-dimethylaminoethyl)ether/30% dipropylene glycol, blow catalyst | 0.64 |
| Tegostab ® B8404 | Polyether polydimethyl-siloxane copolymer surfactant | 0.91 |
| Ortegol ® 501 | organic polymer solution cell opener | 0.14 |
| Water | Blowing agent | 3.63 |
| TOTAL | | 100 |

The x-axis of FIG. 2 is a plot of the Index, i.e., the ratio of isocyanate equivalents to hydroxyl equivalents (including water). The center point represents an Index of 0.90, and the end-points represent Indices of 0.85 and 0.95. The y-axis is a plot of reaction temperature, with isotherms being represented as diagonal lines. The z-axis is a plot of free MDI emitted during foam formation based on the 5 gallon can test procedure described previously. As FIG. 2 indicates, as the Index increases, the free MDI that is volatilized increases because fewer hydroxyl groups are available to react with free MDI. As the reaction temperature increases, the amount of free MDI that is volatilized also increases due to the increased vapor pressure of the MDI. Thus, the index and/or reaction temperature can be varied as desired to obtain the desired degree of volatilized free MDI.

Preferred embodiments have been disclosed. A person of ordinary skill in the art would realize, however, that certain modifications would come within the teachings of this Invention, and the following claims should be studied to determine the true scope and content of the invention. In addition, the methods and structures of representative embodiments can be incorporated in the form of a variety of embodiments, only a few of which are described herein. It will be apparent to the artisan that other embodiments exist that does not depart from the spirit of the invention. Thus, the described embodiments are illustrative and should not be construed as restrictive.

The invention claimed is:

1. A method of making polyurethane foam, comprising:
    reacting a first component comprising at least one polyol and a second component comprising at least one polyisocyanate to form a reaction product,
    wherein the ratio of the number of isocyanate equivalents in the second component to the number of hydroxyl equivalents in the first component is less than 1.0, and the at least one polyol comprises an amine-initiated poly (alkylene oxide)polyol, a polyhydric ether-initiated poly (alkylene oxide)polyol, and a carbohydrate-initiated poly (alkylene oxide)polyol, and the amine-initiated poly (alkylene oxide)polyol is present in an amount from about 10 percent to about 30 percent by weight of the first component and wherein the reaction product is a foam that has a weight, and when the foam is subjected to 95 percent relative humidity for a period of 7 days at a temperature of about 50° C., the foam absorbs an amount of water that is less than about 30 percent of the weight of the foam.

2. The method of claim 1 further comprising maintaining a reaction temperature between about 100° F. and about 130° F.

3. A method of reducing NVH expected to experienced by a substrate, comprising
    mixing a first component comprising at least one polyol with a second component comprising at least one polyisocyanate thereby causing a reaction to form a polyurethane foam; and
    applying the mixture to the substrate that is expected to be exposed to NVH;
    wherein the ratio of the number of isocyanate equivalents in the second component to the number of hydroxyl equivalents in the first component is less than 1.0, and the at least one polyol comprises an amine-initiated poly (alkylene oxide)polyol, a polyhydric ether-initiated poly (alkylene oxide)polyol, and a carbohydrate-initiated poly (alkylene oxide)polyol, and the amine-initiated poly (alkylene oxide)polyol is present in an amount from about 10 percent to about 30 percent by weight of the first component and wherein the polyurethane foam has a weight, and when the polyurethane foam is subjected to 95 percent relative humidity for a period of 7 days at a temperature of about 50° C., the polyurethane foam absorbs an amount of water that is less than about 30 percent of the weight of the foam.

4. The method of claim 3 wherein mixing and applying occurs substantially contemporaneously.

5. The method of claim 3 wherein applying comprises spraying the mixture on the substrate.

6. The method of claim 3 wherein the substrate is a metal surface in a cavity of an automobile.

* * * * *